(12) United States Patent
Scheringer et al.

(10) Patent No.: US 8,052,804 B2
(45) Date of Patent: Nov. 8, 2011

(54) DISHWASHER WITH REGULATABLE HEAT RECOVERY

(75) Inventors: Stefan Scheringer, Offenburg (DE); Bruno Gaus, Offenburg (DE); Thomas Peukert, Oberkirch (DE); Ingo Wiegand, Bühlertal (DE); Michael Streb, Iffezheim (DE)

(73) Assignee: Meiko Maschinenbau GmbH & Co. KG, Offenburg (DE)

( * ) Notice: Subject to any disclaimer, the term of this patent is extended or adjusted under 35 U.S.C. 154(b) by 755 days.

(21) Appl. No.: 10/581,245

(22) PCT Filed: Jan. 18, 2005

(86) PCT No.: PCT/EP2005/000446
§ 371 (c)(1),
(2), (4) Date: Jan. 11, 2007

(87) PCT Pub. No.: WO2005/070276
PCT Pub. Date: Aug. 4, 2005

(65) Prior Publication Data
US 2007/0131260 A1     Jun. 14, 2007

(30) Foreign Application Priority Data
Jan. 26, 2004    (DE) .................... 10 2004 003 797

(51) Int. Cl.
*B08B 3/00*    (2006.01)
(52) U.S. Cl. .................... 134/56 D; 134/57 D; 134/58 D
(58) Field of Classification Search .............. 134/56 D, 134/57 D, 58 D
See application file for complete search history.

(56) References Cited

U.S. PATENT DOCUMENTS

| | | | | |
|---|---|---|---|---|
| 3,598,131 A | * | 8/1971 | Weihe, Jr. ................. | 134/107 |
| 3,789,860 A | * | 2/1974 | Katterheinrich et al. ..... | 165/47 |
| 3,896,827 A | * | 7/1975 | Robinson ................... | 134/10 |
| 4,176,466 A | * | 12/1979 | Pagnozzi et al. ........... | 34/233 |
| 4,326,551 A | * | 4/1982 | Voorhees ................. | 134/58 D |
| 4,336,279 A | * | 6/1982 | Metzger ................... | 427/521 |
| 4,561,904 A | * | 12/1985 | Eberhardt, Jr. ............ | 134/18 |

(Continued)

FOREIGN PATENT DOCUMENTS

DE    18 32 502 U    6/1961

(Continued)

OTHER PUBLICATIONS

DE 30 19 922 Machine Translation.*

(Continued)

*Primary Examiner* — Michael Barr
*Assistant Examiner* — Charles W Kling
(74) *Attorney, Agent, or Firm* — Birch, Stewart, Kolasch & Birch, LLP

(57) ABSTRACT

The invention relates to a conveyor dishwasher having at least one washing zone (3, 4), at least one rinsing zone (5, 6), a suction-extraction location (23) and/or a heat-recovery device (11). The dishwasher also comprises at least one drying zone (7). The flow direction (30) of the exhaust air within the dishwasher runs from the outlet (8) to the inlet (1), counter to the transporting direction (9) of the wash ware (10) through the dishwasher, the suction-extraction location (23) being arranged in the region of the inlet (1) of the dishwasher, and volumes of air (28, 33) which are withdrawn from the drying zone (7) being dependent on positions (34, 35) of exit nozzles (26) for hot air within the drying zone (7).

12 Claims, 2 Drawing Sheets

U.S. PATENT DOCUMENTS

Figure 1:
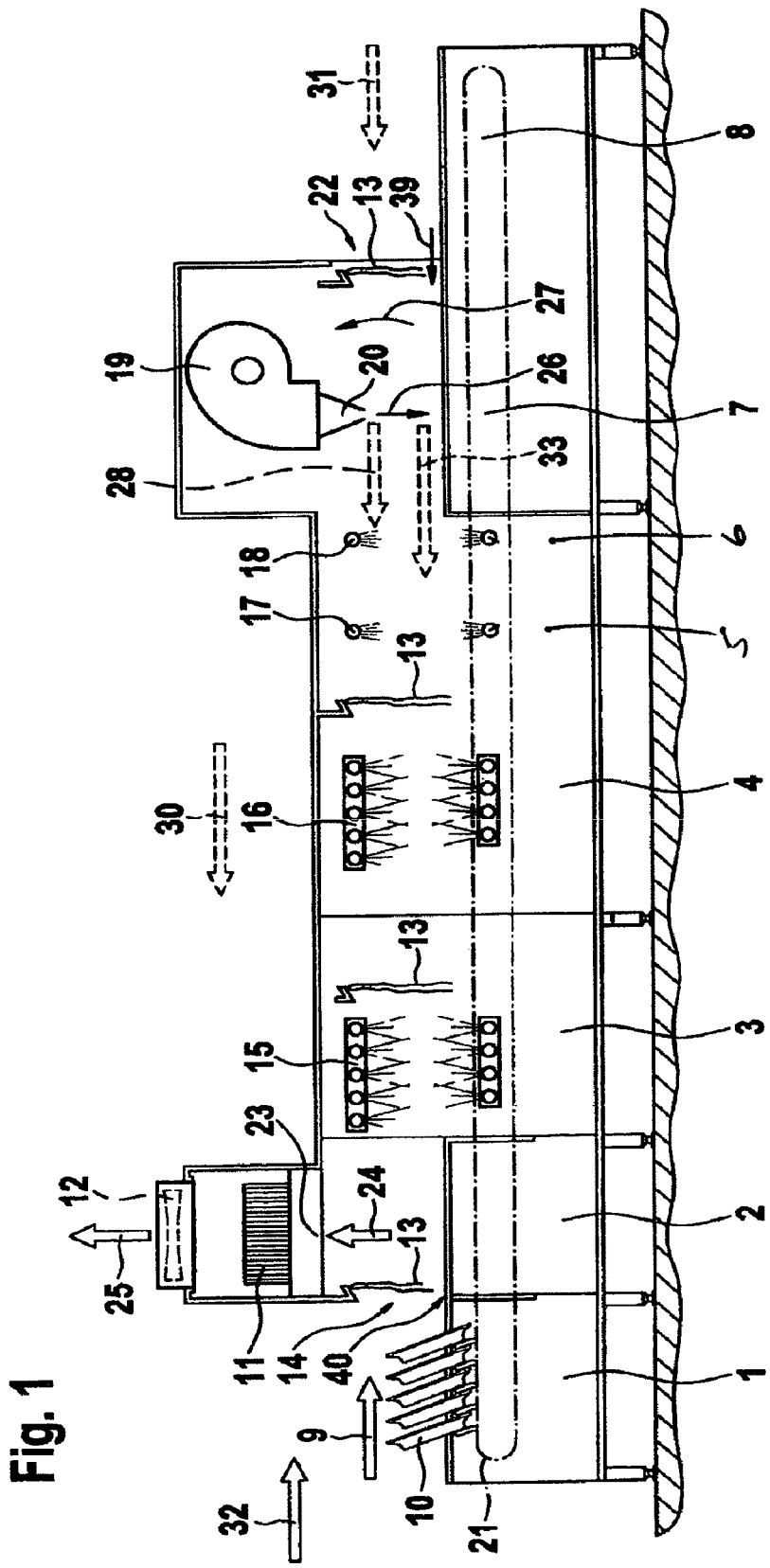

| | | | |
|---|---|---|---|
| 5,820,457 A * | 10/1998 | Kern et al. | 454/315 |
| 2003/0233767 A1* | 12/2003 | Fratello et al. | 34/487 |
| 2005/0072019 A1* | 4/2005 | Rago et al. | 34/96 |
| 2007/0125403 A1* | 6/2007 | Ecker et al. | 134/33 |

FOREIGN PATENT DOCUMENTS

| | | | |
|---|---|---|---|
| DE | 3019922 A * | 12/1981 | |
| DE | 3041635 A * | 6/1982 | |
| DE | 43 10 189 A1 | 10/1994 | |
| EP | 838190 A2 * | 4/1998 | |
| FR | 594 094 A | 9/1925 | |
| FR | 2 059 693 A | 6/1971 | |
| GB | 2030446 A * | 4/1980 | |
| GB | 2155772 A * | 10/1985 | |
| SE | 9503485 A * | 4/1997 | |
| SU | 1496770 A * | 7/1989 | |

OTHER PUBLICATIONS

DE 30 19 922 Machine Translation Dec. 1981 PILZ.*

* cited by examiner

DISHWASHER WITH REGULATABLE HEAT RECOVERY

TECHNICAL FIELD

Dishwashers, in particular those which can be used industrially, usually have an arrangement for utilizing the energy content of the exhaust air and, furthermore, may be equipped with a transporting device which transports the wash ware. In the case of these dishwashers, the dishes run through the various treatment zones within the dishwasher on the transporting device, on the conveying belt thereof or in racks which are arranged specifically on this conveying belt. Such dishwashers have one or more washing or preliminary rinsing zones in which the wash ware is cleaned and disinfected. Also provided are one or more pump-action or clean-water rinsing zones, in which the wash ware is freed of residues of dirt and dishwashing salt, and one or more drying zones, in which the wash ware is dried off. Such dishwashers are also assigned one or more heat-recovery devices, in which air which is extracted by suction from the interior of the dishwasher is channeled via a condenser and dehumidified there. The heat of condensation here is given off, for example, to the clean water which flows to the dishwasher.

PRIOR ART

Dishwashers with a transporting device, i.e. conveyor dishwashers, are usually used industrially. Such dishwashers have at least one washing or preliminary rinsing zone, one or more pumps or clean-water rinsing zones and at least one drying zone. During the process sequence in the different zones mentioned above, clouds of steam (vapors) and moisture-laden hot air are produced, these being directed along within the machine and channeled away via at least one heat-recovery device. In the washing or preliminary rinsing zones of such dishwashers, hot water is circulated for cleaning and disinfecting purposes and sprayed, via suitably dimensioned nozzles, onto the wash ware transported through the conveyor dishwasher. As the dishwashing liquor, i.e. a mixture predominantly comprising water and cleaning agent, exits and comes into contact with the wash ware and with parts of the transporting device or of the machine, clouds of steam (vapors) are produced, and these pass out of the zone or the zones, via the respective inlet and outlet openings, unless appropriate measures are taken. For wash ware with different levels of soiling, conveyor dishwashers are equipped with pumps which can be switched over in order thus with the respective pressure of the cleaning liquor and or the respective quantity of cleaning liquor to be adapted to the degree of soiling of the wash ware which is to be cleaned. Furthermore, heated water is sprayed directly onto the wash ware within a clean-water rinsing zone and/or a pump-action rinsing zone in order for residues of the previously applied dishwashing liquor and also loosened food-residue particles to be rinsed off. The increased temperature of the heated water and the fine spray produce clouds of steam (vapors) which can pass out of the zone, via the transporting openings, unless suitable measures are taken to prevent this.

Furthermore, heated air is blown onto the wash ware by a fan in the drying zone. Depending on the selected capacity and the design of this fan within the drying zone, some of the residual moisture is blown off and the rest of the moisture on the wash ware is evaporated. The heated air absorbs the moisture on the wash ware. A large part of this quantity of air is recirculated, with the result that it is necessary to add relatively dry ambient air in order for new moisture to be absorbed. This means that the same quantity of air which is fed also has to be channeled away again.

Via a heat-recovery device, moisture-laden hot air is transported away out of the machine via a fan in order that no clouds of steam or moisture-laden (hot) air can pass outward from the inlet or outlet opening of the dishwasher and new, relatively dry ambient air can flow in in the drying zone, from which moisture-laden air is withdrawn during the drying process.

DT 22 53 624 C3 discloses an apparatus for the suction extraction, cooling and drying of the steam from a dishwasher. The dishwasher is, in particular, a multi-stage machine for use in catering establishments. The steam passing out of this machine is equipped with a heat exchanger, which is arranged alongside the machine and has water-cooled pipe coils, with a suction-extraction apparatus and with a cover which collects the steam and directs it through the heat exchanger. The water-cooled pipe coils of the heat exchanger, which are enclosed by a housing, are connected both to feed lines for the continuous cooling-water supply, which is switched on during operation, and to feed lines for the supply of additional cooling water, which can be controlled by a switching device. The switching device is controlled in dependence on the dishes, which run through the dishwasher by means of a conveyor. The switching device is provided for actuating a valve connected to the feed line, and it is arranged alongside the final stage of the dishwasher. The switching device is designed, in particular, as a switch which can be actuated by a passing dish rack.

DE 24 57 182 C2 relates to a heat-recovery device for a dishwasher. This device comprises a heat pump in which an operating-fluid circuit contains, one behind the other, a compressor, at least one condenser, which serves for heating water for the dishwasher, and a first expansion valve and an evaporator, which is subjected to the action of waste heat from the dishwasher. The first expansion valve is controlled in dependence on the temperature of the operating fluid on the suction side of the compressor, with the effect of limiting this temperature to the highest temperature value permissible. A further, second expansion valve is located parallel to the first expansion valve. This second expansion valve has a more pronounced restricting action in relation to the first expansion valve and is controlled in dependence on the pressure of the operating fluid at the inlet of the evaporator, with the effect of keeping this pressure constant. The throughflow through the first expansion valve and the second expansion valve is controlled in dependence on the temperature of the heated water such that, when the water temperature drops below a predetermined value, the throughflow through the first expansion valve is released and the throughflow through the second expansion valve is blocked. When this predetermined temperature is exceeded, the throughflow through the first expansion valve is blocked, whereas the throughflow through the second expansion valve is released.

DE 196 44 438 C2 discloses a conveyor dishwasher and a process for cleaning dishes and/or trays. The conveyor dishwasher comprises a cleaning zone with exit nozzles for cleaning liquor and a cleaning tank. Also provided are a rinsing zone with exit nozzles for pump-action rinsing liquid and a pump-action rinsing tank. Arranged between the exit nozzles for the cleaning liquor and the exit nozzles for the pump-action rinsing liquid is at least one preliminary rinsing nozzle, which is subjected to the action of pump-action rinsing liquid. The preliminary rinsing nozzle and the cleaning tank are arranged such that the pump-action rinsing liquid is fed to the cleaning tank from the preliminary rinsing nozzle. The volume flow of the pump-action rinsing liquid of the preliminary rinsing nozzle here corresponds approximately to 50% of the quantity of clean water supplied. In addition, clean-water rinsing nozzles are arranged in the rinsing zone, these nozzles being connected to a mains water supply, into which a heat exchanger may be coupled.

The machine solutions which are available on the market are designed such that the quantities of exhaust air of the at least one heat-recovery device are designed for one operating state—normally for the least favorable operating state. This means that, depending on the operating state of the dishwasher, more air and thus more energy is withdrawn from the dishwasher than would be necessary in order to prevent the occurrence of clouds of steam (vapors) and to introduce dry and/or relatively dry air into the drying zone. For the operators of dishwashers which are designed in this way, this means a higher loss of energy and a resulting higher level of energy expended than would be absolutely necessary.

The following processes are involved in producing the clouds of steam (vapors) and the moisture-laden air within a dishwasher: the dishwashing liquor in the preliminary rinsing and/or washing zones of the dishwasher, this liquor being sprayed in via nozzles, is usually at a temperature of between 40° C. and 45° C., it also being quite possible for temperatures of up to 55° C. to occur in the first washing zone and of 65° C. to occur in the final washing zone. Rinsing water is sprayed in within the clean-water rinsing zone and/or the pump-action rinsing zone, this rinsing water being at a temperature of between 60° C. and 65° C. in the pump-action zone and of 80° C. to 85° C. in the clean-water rinsing zone. Within the drying zone of a conveyor dishwasher, heated air is blown onto the wash ware in order to blow away and dry off the residues of moisture from the wash ware. The temperatures of the air heated in the drying zone are between 60° C. and 90° C.

Air is usually extracted by suction at one or various locations of the dishwasher in order, on the one hand, to prevent clouds of steam from passing out at the inlet or outlet of the dishwasher and, on the other hand, to achieve the situation where the drying zone always has available to it sufficient dry air capable of accommodating moisture. The abovementioned suction-extraction locations are usually provided at the inlet and at the outlet of a conveyor dishwasher and at the inlet of and downstream of the clean-water rinsing zone or the drying zone, or they are arranged downstream of the clean-water rinsing zone and the drying zone.

The direction of the respective nozzles for spraying in dishwasher liquor or blowing in air in at least one preliminary rinsing zone, at least one washing zone and within the pump-action/clean water rinsing zone and/or the drying zone is usually selected such that an air flow in the direction of the suction-extraction locations is built up within the dishwasher. However, this means that, in the least favorable case, suction extraction takes place at those locations at which there is a high temperature and moisture level prevailing, which results in a high difference in temperature level and moisture level being present between the air from the dishwasher which is extracted by suction via the heat-recovery device and the air which is blown out of the dishwasher into the surrounding area or into the open, along the exhaust-air line. The suction-extraction quantities at the different points are usually geared to one operating state—normally maximum operation at full load. These solutions have the disadvantage that during the process, in the different operating states of the dishwasher, too much air and thus heat is extracted by suction from the dishwasher and the suction extraction is carried out at those locations where the temperature and/or the moisture level is too high. Furthermore, there is a risk, with these solutions, of possibly germ-laden aerosols being conveyed from an unclean follow-up washing or rinsing region into one which is clean.

DESCRIPTION OF THE INVENTION

The object of the invention is to design a dishwasher with a transporting device such that the channeling of air within the machine takes place so that air flows specifically from a warmer region into a colder region of the dishwasher.

This object is achieved according to the invention by the features of patent claim 1, according to which air flows from the outlet of the dishwasher to the inlet thereof.

In the case of the solution according to the invention, the air is advantageously directed counter to the transporting direction of the wash ware which is to be cleaned and, in the process, only as much air as is necessary, in accordance with the basic conditions, is channeled through the dishwasher and extracted by suction. The basic conditions include, inter alia, the fact that there must be no cloud of steam or escape of steam or vapors in the region of the inlet and of the outlet of the dishwasher and that the drying zone always contains sufficiently dry air to allow moisture to be absorbed from the wash ware which is to be dried.

The solution which is proposed according to the invention does not just satisfy the two basic conditions mentioned above, but also achieves the following list of advantages. By virtue of air being channeled according to the invention through a dishwasher, energy-rich air is channeled into regions of the dishwasher in which this energy, for example the air temperature, can be used directly without the interposition of heat exchangers being necessary. Furthermore, any aerosols produced are always transported from the cleaner region, in respect of aerosol loading, into the less clean region, in respect of aerosol loading, of the dishwasher. The exhaust air of the dishwasher can be cooled, by the addition of a small quantity of cooling water, to the extent where it can be channeled directly into the area in which the dishwasher is set up, so that there is no danger of this area being excessively heated, and the situation where exhaust air is channeled outward, which can result in considerable difficulties on site, can be avoided.

The proposed solution provides for suction extraction within the inlet region of the dishwasher. Flow builds up through the nozzles which are used in the washing zone or the rinsing zone, or through the nozzles which are present in the drying zone for the purpose of blowing in hot air, by the outflow direction of these nozzles being altered in a regulated manner in relation to the inlet region and/or the outlet region of the dishwasher, in dependence on the process which is taking place in each case. Air passing out of the nozzles entrains the air surrounding the same and achieves a build-up of flow from the outlet region of the dishwasher into the inlet region of the same.

The solution proposed according to the invention makes it possible to alter the overall suction-extraction quantity in dependence on the respective process. Via the outflow direction of all the media, be this the cleaning fluid, the clean water or the air which is blown out in the drying zone, it is possible to influence the air flow within the dishwasher in the direction from the outlet to the inlet, i.e. counter to the transporting direction of the wash ware which is to be cleaned.

DRAWINGS

Figure 2:
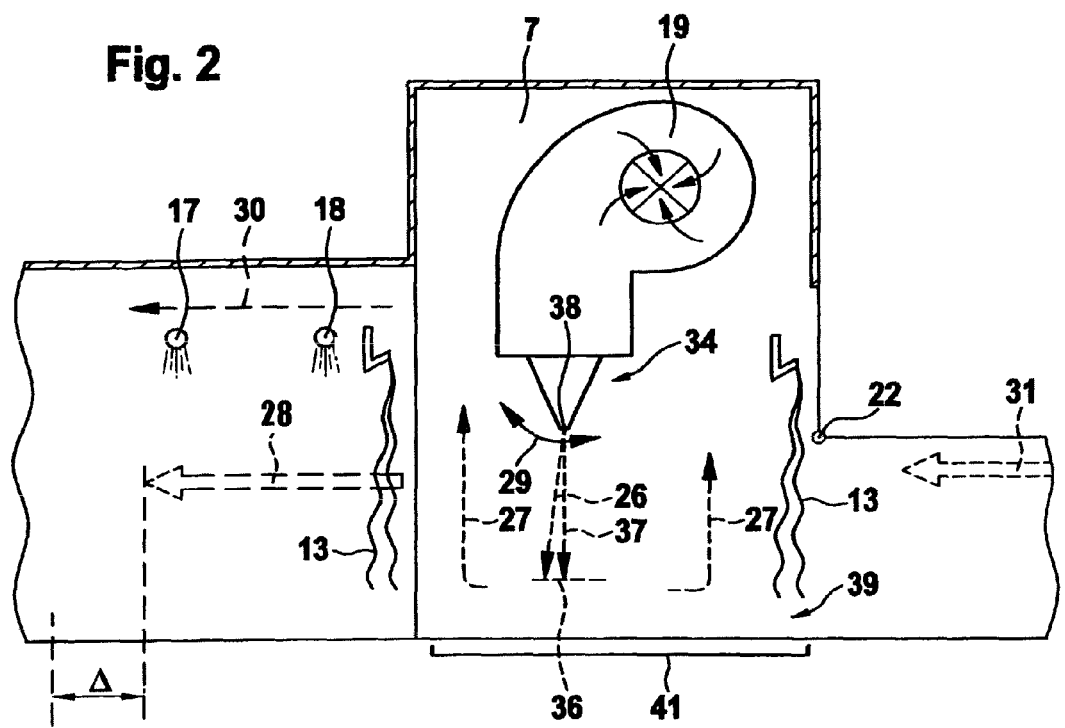
Figure 3:
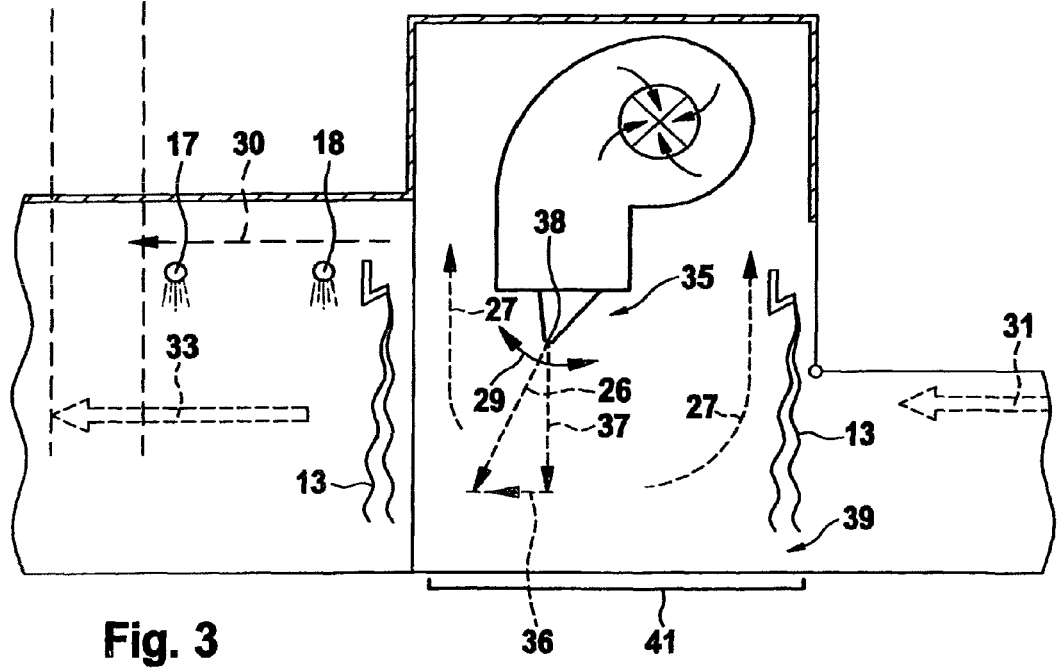

The invention is described in more detail hereinbelow with reference to the drawings, in which:

FIG. 1 shows a schematic illustration of the channeling of air through a conveyor dishwasher which has been proposed according to the invention, FIG. 2 shows a fan which is arranged within a drying zone and has a pivotably designed exit nozzle, and FIG. 3 shows the hot-air fan which is illustrated in FIG. 2, is accommodated within a drying zone and has a pivotable exit nozzle, the latter being set in a deflected position.

VARIANTS

FIG. 1 shows a schematic illustration of a dishwasher in which air flows counter to the direction in which wash ware runs through the dishwasher. In the dish-washer illustrated, the wash ware is transported by means of a conveying belt 21.

At an inlet 1, wash ware 10 accommodated on the top side of a conveying belt 21 runs into an inlet tunnel 2. The inlet tunnel 2 is screened in the outward direction by means of a separating curtain 13 in order to prevent the escape of clouds of steam in the region of the inlet 1 of the dishwasher. Once the wash ware 10, which is accommodated on the top side of the conveying belt 21 and is transported in the transporting direction 9, have passed the inlet tunnel 2, it is transported into a preliminary rinsing zone 3. A preliminary rinsing system 15 is arranged within the preliminary rinsing zone 3. The preliminary rinsing system 15 has spray tubes which are arranged on the underside and above the circulating conveying belt 21. A pump, which can be regulated in terms of capacity but is not illustrated in FIG. 1, supplies the preliminary rinsing system 15 with cleaning fluid in accordance with the degree of soiling of the wash ware 10. The preliminary rinsing zone 3 is separated from a following washing zone 4 via a further separating curtain 13.

Once past the preliminary rinsing zone 3, the wash ware 10 runs into the washing zone 4. The washing zone 4 likewise comprises a washing system, designated 16. Once the wash ware 10 has left the preliminary rinsing zone 3, it passes into the washing zone 4. The washing zone also comprises a washing system 16, which is arranged above and beneath the top side of the circulating conveying belt 21. The washing zone 4 is likewise assigned a pump which can be regulated in a variable manner in respect of pumping capacity and via which the spray tubes of the washing system 16 are supplied with cleaning fluid in accordance with the degree of soiling of the washing system 16 in accordance with the degree of soiling of the wash ware 10, this cleaning fluid being subjected to a relatively high or low pressure—in dependence on the degree of soiling. The washing zone 4 is separated by a further separating curtain 13 from the pump-action rinsing zone 5, which has a washing system in the form of two mutually opposite spray tubes, one arranged above, and one arranged beneath, the top side of the conveying belt 21. The pump-action rinsing zone 5 is followed by a clean-water rinsing zone 6. Within the clean-water rinsing zone 6, the wash ware 10 is rinsed off with clean water in order for any remaining soiling and/or the previously applied cleaning agent to be removed from the wash ware 10 before it enters into a drying zone 7.

The drying zone 7, which has a removal section 8 located downstream of it, contains a drying fan 19. The drying fan 19 takes in air and heats the latter. The air which is heated in the drying fan 19 enters into an exit funnel 20, at the bottom end of which is located an exit nozzle which deflects the exiting drying air onto the wash ware 10 passing the drying zone 7. A deflecting surface 41 may be provided beneath the drying zone 7, the hot air which passes out of the exit nozzle in the exit direction 26 being deflected in the flow direction 27 by this deflecting surface, with the result that some of this hot air flows back to the drying fan 19. As seen in the transporting direction 9 of the wash ware 10, the drying zone 7 is screened from the removal section 8 via a further separating curtain 13.

As the wash ware 10 is transported through the dishwasher illustrated in FIG. 1, its temperature increases continuously. From room temperature, the temperature of the wash ware 10 increases, in the preliminary rinsing zone 3, to, for example, a temperature of 40° C. to 45° C. and, in the following washing zone 4, to 55° C. to 65° C. and, in the following pump-action rinsing zone 5 and clean-water rinsing zone 6, to a temperature of between 60° C. and 85° C. In the drying zone 7, the wash ware 10 which is to be dried off is at a temperature of up to 90° C.

The fan 12 assigned to the heat-recovery device 11 generates, within the dishwasher, a negative pressure which allows an exhaust-air stream 24 to be extracted by suction at a suction-extraction location 23. The suction extraction of the exhaust-air stream 24 at the suction-extraction location 23 prevents clouds of steam (vapors) from passing out of the dishwasher at the inlet 1 and at the removal section 8. This is achieved, on the one hand, by the separating curtains 13 arranged there and, on the other hand, by the fan 12, which generates a negative pressure. Located beneath the separating curtains 13 at the inlet tunnel 2 and at the removal section 8, beneath the separating curtains 13, are gap-like openings, via which external-air streams 31 and 32 enter into the dishwasher in each case and which correspond to the overall volume flow of the exhaust-air stream 24. The channeling of air within the dishwasher according to the illustration in FIG. 1 is selected such that the various zones through which the wash ware 10 runs has the exhaust-air stream flowing through them counter to the transporting direction 9 of the wash ware 10, as is indicated by designation 30. The flow movement 30 of the exhaust-air stream 24 is brought about, on the one hand, by the fan 12, which is assigned to the heat-recovery device 11, and, on the other hand, by the drying fan 19. Depending on the inclination of the exit nozzles of the drying fan 19, a first, relatively small quantity of air 28 or a second, larger quantity of air 33 can be withdrawn from the drying zone 7. If there is no wash ware present in the drying zone 7, there is less moisture in the drying zone 7 and only the first quantity of air 28 is channeled away at the transition from the drying zone 7 into the clean-water rinsing zone 6. However, if there is wash ware to be dried in the drying zone 7, then, in addition to the first quantity of air 28, it is also necessary for the second, larger quantity of air 33 to be channeled away from the drying zone 7 at the transition from the drying zone 7 into the clean-water rinsing zone 6. This means that, depending on the air streams 28 and 33, different quantities of air are channeled in via the opening 22 in the direction 31. Via the inlet opening 14, in contrast, it is always the case that the second external-air stream 32 is taken in and also channeled away via the heat-recovery device 11. This ensures that no clouds of steam pass out of the dishwasher at the inlet opening 14 into the inlet tunnel 2, and the same applies to the opening in the region of the outlet 22 of the dishwasher.

Within the drying zone 7, the air is circulated by means of the fan 19 and partially mixed with clean air which has been taken in (first external-air stream 31) in order to keep the air capable of absorbing moisture. Via the drying fan 19, the air, once past an exit funnel 20, is blown, via exit nozzles, onto the wash ware 10 which is to be dried. The volume of air which is extracted by suction from the drying zone 7, be this the first quantity of air 28 or the second quantity of air 33 (in dependence on the operating state of the drying zone 7), is channeled, within the dishwasher, via the clean-water rinsing zone 6, the pump-action rinsing zone 5, the washing zone 4 and the preliminary rinsing zone 3. In this case, the air stream passing the zones listed can give off energy in the form of heat to the respective zone, is thus cooled and leaves the dishwasher at the suction-extraction location 23 as an exhaust-air stream 24 with a favorable energy level. During passage through the various zones of the dishwasher in the flow direction 30, the energy content of the exhaust-air stream is cooled. As a result, the exhaust-air stream 24, which leaves the dishwasher above the heat-recovery device 11, gives off its heat, prior to being channeled away to the surroundings, to the zones 3, 4, 5 and/or 6 located upstream of the drying zone 7. Depending on the number of zones 3, 4, 5 or 6 located upstream of the drying zone 7, it is also possible for the heat-recovery device 11 to be placed closer to the drying zone 7.

The drying fan with exit nozzles, which is arranged in the drying zone, can be gathered in more detail from the illustration according to FIG. 2.

The illustration according to FIG. 2 shows that the washing systems 17, 18 of the pump-action rinsing zone 5 and of the clean-water rinsing zone 6, respectively, are separated off from the drying zone 7 by means of a further separating curtain 13. This avoids spray water passing out of the pump-action rinsing zone 5 or the clean-water water rinsing zone 6 into the drying zone 7. Via the drying fan 19, which is arranged in the drying zone 7, air is taken in from the drying zone 7, heated and blown out again, via an exit cross section 38 of an exit nozzle, into the drying zone 7 in the direction of the wash ware 10 which is to have moisture blown off it. In the illustration according to FIG. 2, the exit nozzle 26 is located in an approximately vertical position, the hot-air jet which passes out of the exit nozzle 26 having a horizontal component 36 and a vertical component 37. The exit nozzle 26 beneath the drying fan 19 is of pivotable design and can be pivoted in the direction of the arrow 29. The jets of air which pass out of the exit nozzle 26 come into contact with a deflecting surface 41 arranged beneath the conveying belt 21. By virtue of this deflecting surface, the hot-air jets which blow moisture off the wash ware 10 are deflected and produce a flow 27 within the drying zone 7. In order to improve the moisture-absorption capability of the hot air which is circulated within the drying zone 7, the first external-air stream 31 is taken in via the first intake gap 39 beneath the further separating curtain 13 downstream of the drying zone 7. The first quantity of air 28 leaves the drying zone 7 in the counter-flow direction 30. When the drying fan 19 is switched on, the first quantity of air 28 is identical to the first external-air stream 31. In the case which is illustrated in FIG. 2, the exit nozzle 26 beneath the drying fan 19 is positioned obliquely only to a slight extent, so that it is only the first quantity of air 28 which is channeled in the counter-flow direction 30 through the dishwasher. This is the case, for example, when the air within the drying zone 7 has a low moisture content. The first quantity of air 28 is, then, of such a magnitude that no clouds of steam or moisture-laden air pass/passes out of the dishwasher at the outlet opening 22.

In the illustration according to FIG. 3, the exit nozzle beneath the drying fan has been set in a pivoted position. In dependence on the degree of deflection 29 of the exit nozzle 26, the hot-air jet which passes out of this nozzle has a larger horizontal component 36. Furthermore, the hot-air jet which passes out of the exit nozzle 26 in the second position 35 of the latter also has the vertical component 37. The vertical component 37 gives rise to a flow 27 of hot air within the drying zone 7 which assists the circulation of the air within the drying zone 7 by way of the drying fan 19. The vertical component 37 interacts with the essentially horizontally running deflecting surface 41, so that the hot air which comes into contact with the deflecting surface 41 is redirected upward again in the direction of the drying fan 19. On account of the larger horizontal component 36 of the hot-air jet passing out of the exit nozzle 26, the second quantity of air 33 is directed in the flow direction 30—counter to the transporting direction of the wash ware 10—in the direction of the suction-extraction location 23 illustrated in FIG. 1. This is the case, for example, when there is an increase in the moisture content of the hot air in the drying zone 7. If the second quantity of air 33 is channeled in the flow direction 30, counter to the transporting direction of the wash ware 10 through the dishwasher, the capacity of the fan 12 of the heat-recovery device 11 is correspondingly increased in order to channel this larger quantity of air out of the dishwasher.

It is also the case with the illustration according to FIG. 3 that the first external-air stream 31 enters into the drying zone 7 via the first intake gap 39 and mixes with the air which is circulated in this zone by the drying fan 19. The first external-air stream 31 has a considerably lower water content than the air which is circulated within the drying zone 7 and thus, upon mixing with this air, improves the moisture-absorption behavior of the hot air within the drying zone 7.

By virtue of air being channeled in the flow direction 30 counter to the transporting direction 9 of the wash ware 10 through the dishwasher according to the illustration in FIG. 1, energy-rich, i.e. hot, air is channeled into regions of the dishwasher in which the energy can be used directly without any interposed heat exchangers. On account of the air channeling proposed, any aerosols produced are always conveyed from cleaner regions into less clean regions of the dishwasher. On account of passing through zones 6, 5, 4 and 3, the exhaust air of the dishwasher cools—as seen in the flow direction 30 of the exhaust air—to the extent where, within the heat-recovery device 11, it only requires small quantities of cooling water before being directed, in exit direction 25, into the surroundings. The solution proposed according to the invention can achieve an air-flow build-up within a dishwasher, along the exit nozzles within the washing zones 3, 4 or rinsing zones 5, 6 and the drying zone 7, in the case of which the outflow can be altered in a regulated manner in relation to the inlet 1 and the outlet 8 of the dishwasher, in dependence on the respective process which is taking place in the individual zones of the dishwasher. Furthermore, the channeling of air through a dishwasher which is proposed according to the invention advantageously makes it possible to influence the overall exhaust-air stream 24 in dependence on the process.

The dishwasher which is illustrated in FIG. 1 can be operated by a regulating means so as to ensure that the exhaust-air stream which leaves the dishwasher is always minimized. Input variables for the regulating means are, for example, the following operating parameters: the presence or absence of wash ware 10 in the drying zone 7, the level of the moisture content x of the air within the drying zone 7, and the temperature level there. The following manipulated variables: pivoting path 29 of the exit nozzle 26 beneath the drying fan 19 and the capacity of the drive of the fan 12 in the heat-recovery device 11 can be adapted in dependence on these input variables for a regulating means. If the drying zone 7 is not in operation, then only the first external-air stream 31 and the second external-air stream 32 are extracted by suction via the fan 12 of the heat-recovery device 11, in order to prevent the escape of clouds of steam or moisture at the inlet 1 and outlet 8 of the dishwasher. If, in contrast, the drying zone 7 is in operation, then the second quantity of air 33, which is made up of the first external-air stream 31 and a further fraction of air which is extracted by suction from the drying zone 7 in the case of a high moisture content, is channeled away out of the dishwasher from the drying zone 7 together with the second external-air stream 32.

The illustration according to FIG. 1 shows a conveyor dishwasher which includes a circulating conveying belt 21. Instead of the circulating conveying belt, it is also possible for the wash ware 10 to run through the dishwasher in the transporting direction 9 by way of conveying racks, which are conveyed through the dishwasher by means of a chain or a ratchet rail. The dishwasher which is illustrated in FIG. 1 comprises a preliminary rinsing zone 3 and the pump-action rinsing zone 5, which is designated 5 but is not absolutely necessary, and the clean-water rinsing zone 6. The preliminary rinsing zone 3 and the pump-action rinsing zone 5 may just be provided on an optional basis. The essential factor is to produce, within the dishwasher, an air flow counter to the transporting direction 9 of the wash ware 10 through the dishwasher. For this purpose, the suction-extraction location 23 is advantageously always located upstream of the drying zone 7—as seen in the transporting direction 9 of the wash ware 10—in order to make it possible for the exhaust-air stream to give off heat to those zones of the dishwasher which are located upstream of the drying zone 7. Δ designates the difference between the first quantity of air 28 and the second quantity of air 33.

LIST OF DESIGNATIONS

1 Inlet
2 Inlet tunnel
3 Preliminary rinsing zone
4 Washing zone
5 Pump-action rinsing zone
6 Clean-water rinsing zone
7 Drying zone
8 Removal section
9 Transporting direction of the wash ware
10 Wash ware
11 Heat-recovery device
12 Fan
13 Separating curtain
14 Inlet opening
15 Preliminary rinsing system
16 Washing system
17 Washing system (pump-action rinsing zone)
18 Washing system (clean-water rinsing zone)
19 Drying fan
20 Exit funnel
21 Conveying belt
22 Outlet opening
23 Suction-extraction location
24 Exhaust-air stream
25 Exit direction
26 Exit nozzles and jet
27 Exit (flow)
28 First quantity of air
29 Pivoting path
30 Flow direction in the dishwasher
31 First external-air stream
32 Second external-air stream
33 Second quantity of air
34 First position of the exit nozzle 26
35 Second position of the exit nozzle 26
36 Horizontal component
37 Vertical component
38 Cross section of the exit nozzle
39 First intake gap
40 Second intake gap
41 Deflecting surface
Δ Difference between quantities of air

The invention claimed is:

1. A conveyor dishwasher having at least one washing zone, at least one rinsing zone, a drying zone, a suction-extraction location for an exhaust-air stream and a transporting device for conveying wash ware in a transporting direction through the conveyor dishwasher, and wherein:
   a drying fan with pivotable exit nozzles is provided in the drying zone for producing a heated air stream, whereby, depending on the position of the pivotable exit nozzles, a variable flow volume of the heated air stream is channeled in a flow direction counter to the transport direction of the wash ware through the dishwasher,
   air intake openings, that can accommodate external-air streams drawn into the dishwasher, are provided at an inlet and an outlet of the dishwasher;
   the suction-extraction location is disposed upstream, relative to the transporting direction, of the at least one washing zone, the at least one rinsing zone and the drying zone; and
   a motor-driven fan with an air intake communicating with the interior of the dishwasher is disposed at the suction-extraction location, whereby a heated air stream is produced that moves through the dishwasher in a direction counter to the transporting direction.

2. The conveyor dishwasher as claimed in claim 1, wherein, in a first position of the pivotable exit nozzles within the drying zone, the dishwasher being operable without clouds of steam at the inlet and outlet.

3. The conveyor dishwasher as claimed in claim 1, wherein a deflecting surface is accommodated in a region of the drying zone, beneath the pivotable exit nozzles for deflecting heated air into the drying zone.

4. The conveyor dishwasher as claimed in claim 3, wherein the deflecting surface is of essentially horizontal design and runs beneath the device for transporting the wash ware.

5. The conveyor dishwasher as claimed in claim 1, wherein the drying zone is provided with a separating curtain on the outlet side, as seen in the transporting direction of the wash ware, and
   this separating curtain bounds the air intake opening at the outlet of the dishwasher, via which an external-air stream can be taken into the drying zone.

6. The conveyor dishwasher as claimed in claim 1, wherein:
   a heat-recovery device is disposed in the path of air flow generated by the motor-driven fan; and wherein
   the capacity of the motor-driven fan is dependent on a quantity of air which can be channeled away out of the drying zone.

7. The conveyor dishwasher as claimed in claim 1, wherein the exhaust-air stream which is extracted via the suction-extraction location corresponds to the external-air streams which are taken in via intake openings.

8. The conveyor dishwasher as claimed in claim 1, wherein the pivotable exit nozzles within the drying zone can be pivotally adjusted by electromotive, pneumatic or hydraulic means or mechanically via levers.

9. The conveyor dishwasher as claimed in claim 8, wherein the pivotable exit nozzles can be pivotally adjusted during operation of the conveyor dishwasher.

10. The conveyor dishwasher as claimed in claim 1, wherein:
   a heat-recovery device is disposed in the path of air flow generated by the motor-driven fan;
   the motor-driven fan is a speed-regulated fan; and
   the exhaust-air stream is regulated by regulating the speed of the fan.

11. The conveyor dishwasher as claimed in claim 1, wherein:
- a heat recovery device is disposed in the path of air flow generated by the motor-driven fan;
- the motor-driven fan is provided with a variable-capacity drive for varying the capacity of the motor-driven fan; and
- a position of the pivotable exit nozzles and/or a capacity of the motor-driven fan are/is regulated in dependence on operating states of the dishwasher and/or on at least one of the following process parameters: temperature ($\pi$), moisture content ($x$) in the drying zone or at the inlet and outlet.

12. The conveyor dishwasher as claimed in claim 11, wherein the regulation of a manipulated-variable position of the pivotable exit nozzles and/or the capacity of the drive of the motor-driven fan are/is regulated in dependence on at least one of (1) wash ware which is present in the drying zone, (2) the moisture content ($x$) of the heated air which is circulating in the drying zone and (3) the temperature ($\pi$) prevailing in the drying zone.

\* \* \* \* \*